(12) United States Patent
Xiang et al.

(10) Patent No.: US 12,408,598 B2
(45) Date of Patent: Sep. 9, 2025

(54) BOILER FOR CO-FIRING MUNICIPAL SOLID WASTE AND SHORT TIMBER FOR CULTIVATING FUNGUS

(71) Applicant: ZHEJIANG WEIMING ENVIRONMENT PROTECTION CO., LTD., Wenzhou (CN)

(72) Inventors: Guangming Xiang, Wenzhou (CN); Rong Li, Wenzhou (CN); Yuan Ren, Wenzhou (CN)

(73) Assignee: ZHEJIANG WEIMING ENVIRONMENT PROTECTION CO., LTD.

( * ) Notice: Subject to any disclaimer, the term of this patent is extended or adjusted under 35 U.S.C. 154(b) by 1002 days.

(21) Appl. No.: 17/500,607

(22) Filed: Oct. 13, 2021

(65) Prior Publication Data

US 2022/0110271 A1 Apr. 14, 2022

(30) Foreign Application Priority Data

Oct. 14, 2020 (CN) .......................... 202011095236.X

(51) Int. Cl.
*A01G 18/22* (2018.01)
*F22B 7/00* (2006.01)

(52) U.S. Cl.
CPC ................ *A01G 18/22* (2018.02); *F22B 7/00* (2013.01)

(58) Field of Classification Search
CPC .................................. A01G 18/22; F22B 7/00
USPC ......................................................... 110/234
See application file for complete search history.

(56) References Cited

U.S. PATENT DOCUMENTS

| | | | | |
|---|---|---|---|---|
| 950,977 | A * | 3/1910 | Welcome | |
| 1,520,236 | A * | 12/1924 | Gilchrist | F23B 5/00 122/51 |
| 1,664,029 | A * | 3/1928 | Gilchrist | F23M 5/02 110/234 |
| 5,022,329 | A * | 6/1991 | Rackley | F23G 5/006 110/237 |
| 5,052,312 | A * | 10/1991 | Rackley | F23G 5/32 110/259 |

(Continued)

FOREIGN PATENT DOCUMENTS

| | | | | |
|---|---|---|---|---|
| GB | 2093171 A | * | 8/1982 | F22B 31/00 |
| SE | 523366 C2 | * | 4/2004 | F23B 50/10 |

*Primary Examiner* — Wayne A Langel
(74) *Attorney, Agent, or Firm* — Lambert Shortell & Connaughton; David J. Connaughton, Jr.; Justin P. Tinger

(57) ABSTRACT

A boiler for co-firing municipal solid waste and short timber for cultivating fungus includes a boiler chamber and fire grate, where the boiler chamber comprises a furnace, a reburning chamber and a third flue, a front arch and a rear arch are arranged on a lower portion of the furnace and located above the fire grate, and a short timber for cultivating fungus feeding device is arranged on a lower portion of a front wall of the furnace. The short timber for cultivating fungus feeding device includes a star-shaped feeding machine and a hopper, a skin expansion joint is arranged between the star-shaped feeding machine and the hopper, and an air pipe is arranged on the hopper. A layer of a plurality of boiler internal desulfurization desulfurization nozzles and two layers of a plurality of Polymer Non-Catalytic Reduction denitration nozzles are arranged in a height direction of the furnace.

3 Claims, 4 Drawing Sheets

(56) References Cited

U.S. PATENT DOCUMENTS

| | | | | |
|---|---|---|---|---|
| 5,572,956 | A | * | 11/1996 | Hallstrom ............... F23D 14/78 |
| | | | | 110/210 |
| 5,937,772 | A | * | 8/1999 | Khinkis ................. F23G 5/002 |
| | | | | 110/165 A |
| 6,694,900 | B2 | * | 2/2004 | Lissianski ................ F23G 7/07 |
| | | | | 110/344 |
| 2011/0214593 | A1 | * | 9/2011 | Roychoudhury ......... F23G 5/44 |
| | | | | 110/255 |
| 2013/0247800 | A1 | * | 9/2013 | Higgins ................... F23G 5/04 |
| | | | | 110/118 |
| 2014/0352634 | A1 | * | 12/2014 | Sullivan ................. F22B 21/04 |
| | | | | 122/335 |

\* cited by examiner

BOILER FOR CO-FIRING MUNICIPAL SOLID WASTE AND SHORT TIMBER FOR CULTIVATING FUNGUS

CROSS REFERENCE TO RELATED APPLICATION

This application claims the benefit and priority of Chinese Patent Application No. 202011095236.X entitled "Boiler for Co-firing Municipal Solid Waste and Short Timber for Cultivating Fungus" filed with the Chinese Patent Office on Oct. 14, 2020, which is incorporated herein by reference in its entirety.

TECHNICAL FIELD

The present disclosure relates to the field of boiler equipment, and in particular to a boiler for co-firing municipal solid waste and short timber for cultivating fungus to generate steam for steam supply and power generation.

BACKGROUND ART

With the acceleration of social and economic development and urbanization process and the continuous improvement of the living standard of urban residents, more and more municipal waste is generated in daily life. With the rise of the technology of fungus plantation on ground, the fungus plantation industry enters a rapid development period. The timber for artificial cultivation of the fungus plantation should be used, which is called short timber for cultivating fungus. Municipal solid waste and short timber are incinerated in the boiler, and generated steam is used for power generation and steam supply, which has social benefits of saving energy and reducing environmental pollution, as well as good economic benefits.

In consideration of low calorific value, high water content and high ash content characteristics of municipal domestic waste and high calorific value, low water content and low ash content characteristics of short timber, the present disclosure provides the boiler for co-firing municipal solid waste and short timber for cultivating fungus.

SUMMARY

The embodiments aim to provide a boiler for co-firing municipal solid waste and short timber for cultivating fungus. In order to ensure that fuel is fully combusted and burned out, a combustion mode combining layer combustion and suspension combustion is adopted.

To achieve the above purpose, the present disclosure adopts the following technical scheme.

The boiler for co-firing municipal solid waste and short timber for cultivating fungus includes the boiler chamber and a fire grate. The boiler chamber includes a furnace, a reburning chamber and third flue. A front arch and a rear arch are arranged on a lower portion of the furnace and located above the fire grate. And an short timber for cultivating fungus feeding device is arranged on a lower portion of a front wall of the furnace.

In some embodiments, the short timber for cultivating fungus feeding device may include a star-shaped feeding machine and a hopper. A skin expansion joint may be arranged between the star-shaped feeding machine and the hopper. And an air pipe may be arranged on the hopper.

In some embodiments, multiple layers of secondary air may be distributed at the lower portion of the front wall of the furnace, the front arch and the rear arch.

In some embodiments, the reburning chamber, the third flue, a horizontal flue and a tail flue may be sequentially arranged behind the furnace.

In some embodiments, a layer of multiple boiler internal desulfurization nozzles and two layers of multiple Polymer Non-Catalytic Reduction (PNCR) denitrification nozzles may be arranged in the height direction of the furnace.

In some embodiments, a baking soda dry-method deacidification nozzle may be arranged at a top of the tail flue.

By adopting the above solution, the embodiments have the following advantages.

1. With regard to low calorific value, high water content and high ash content characteristics of municipal solid waste and high calorific value, low water content and low ash content characteristics of short timber, the boiler adopts a mode of combining the two-stage reciprocating grate with the short timber for cultivating fungus feeding device to implement combustion. Namely, municipal solid waste is incinerated on grate surface, then short timber are thrown onto the bed surface to be incinerated. In the throwing process, part of fine chips begin to be combusted in a suspension mode, and large particles fall onto the bed surface to be combusted continuously. In the case, the layer combustion and suspension combustion technology is adopted so that the combustion strength is high, and combustion is complete and sufficient.
2. The short timber for cultivating fungus feeding device includes the star-shaped feeding machine and the hopper. The skin expansion joint is arranged between the star-shaped feeding machine and the hopper for free expansion. And in order to prevent block caused by the short timber and tempering, two air pipes are arranged on each hopper to blow downwards.
3. A layer of multiple boiler internal desulfurization nozzles and two layers of multiple PNCR denitration nozzles are arranged on the furnace. According to boiler internal desulfurization, lime powder is sprayed into the furnace to react with flue gas, so that desulfurization is achieved. And according to PNCR denitration, a macromolecular denitration agent (75% of urea, 15% of melamine and 10% of activated carbon) is used as a reaction medium, a contact area of powdery denitration agent and flue gas is large, the reaction is sufficient, and therefore effective denitration is carried out.
4. The front arch and the rear arch are arranged on the lower portion of the furnace and located above the fire grate, multiple layers of secondary air are arranged on the front wall of the lower portion of the furnace, the front arch and the rear arch, and an air volume accounts for 40%-50% of the total air volume. The effects of high-speed secondary air jet flow leading and pushing flue gas is fully utilized to enhance the disturbance of the flue gas, cause flue gas vortex, prolong the stroke of the flue gas in the furnace, and improve the filling degree of air flow in the furnace, so that fuel and air are fully mixed, completely combusted and burned.
5. The multiple dry deacidification nozzles are formed in the top of the tail flue, and baking soda is sprayed into the flue to react with flue gas, so that deacidification is achieved.

Figure 1:
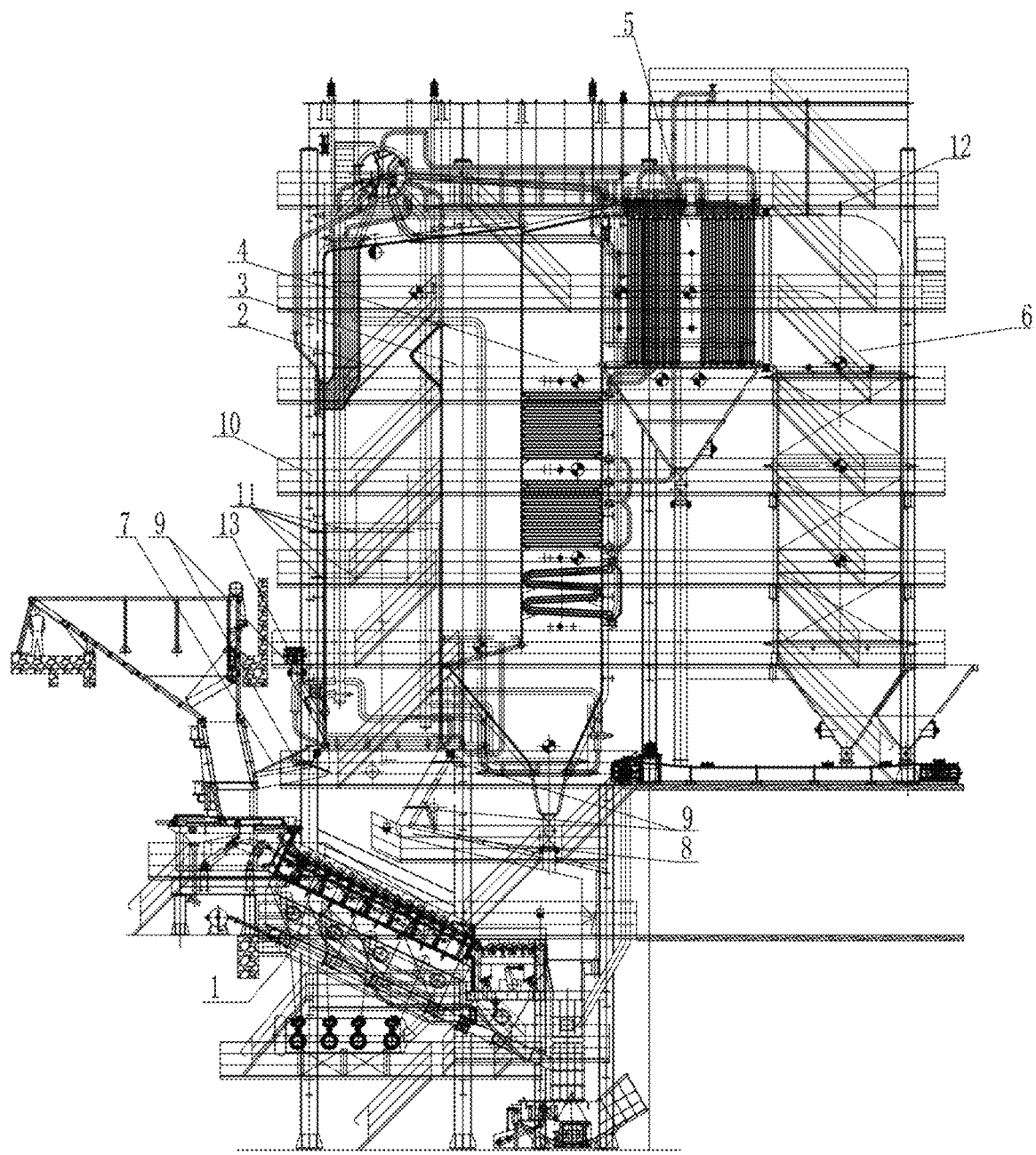
FIG. 1 is a side view of a schematic diagram of a general structure of the present disclosure.

List of reference characters: 1 fire grate; 2 furnace; 3 reburning chamber; 4 third flue; 5 horizontal flue; 6 tail flue; 7 front arch; 8 rear arch; 9 multiple layers of secondary air; 10 boiler internal desulfurization nozzle; 11 Polymer Non-Catalytic Reduction denitration nozzle; 12 baking soda dry deacidification nozzle; 13 short timber for cultivating fungus feeding device; 14 star-shaped feeding machine; 15 skin expansion joint; 16 hopper; 17 air pipe; and 18 boiler chamber.

DETAILED DESCRIPTION OF THE EMBODIMENTS

The present disclosure is further described below in combination with the accompanying drawings.

Figure 2:
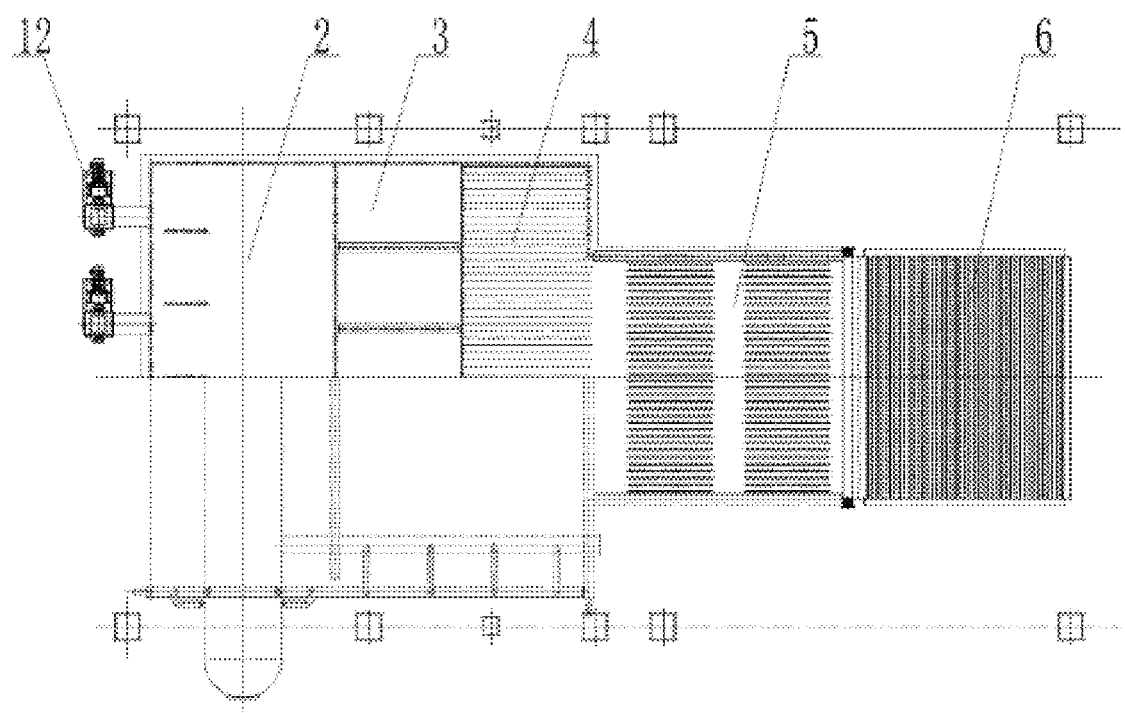
FIG. 2 is top view of the schematic diagram of a general structure of the present disclosure.
Figure 3:
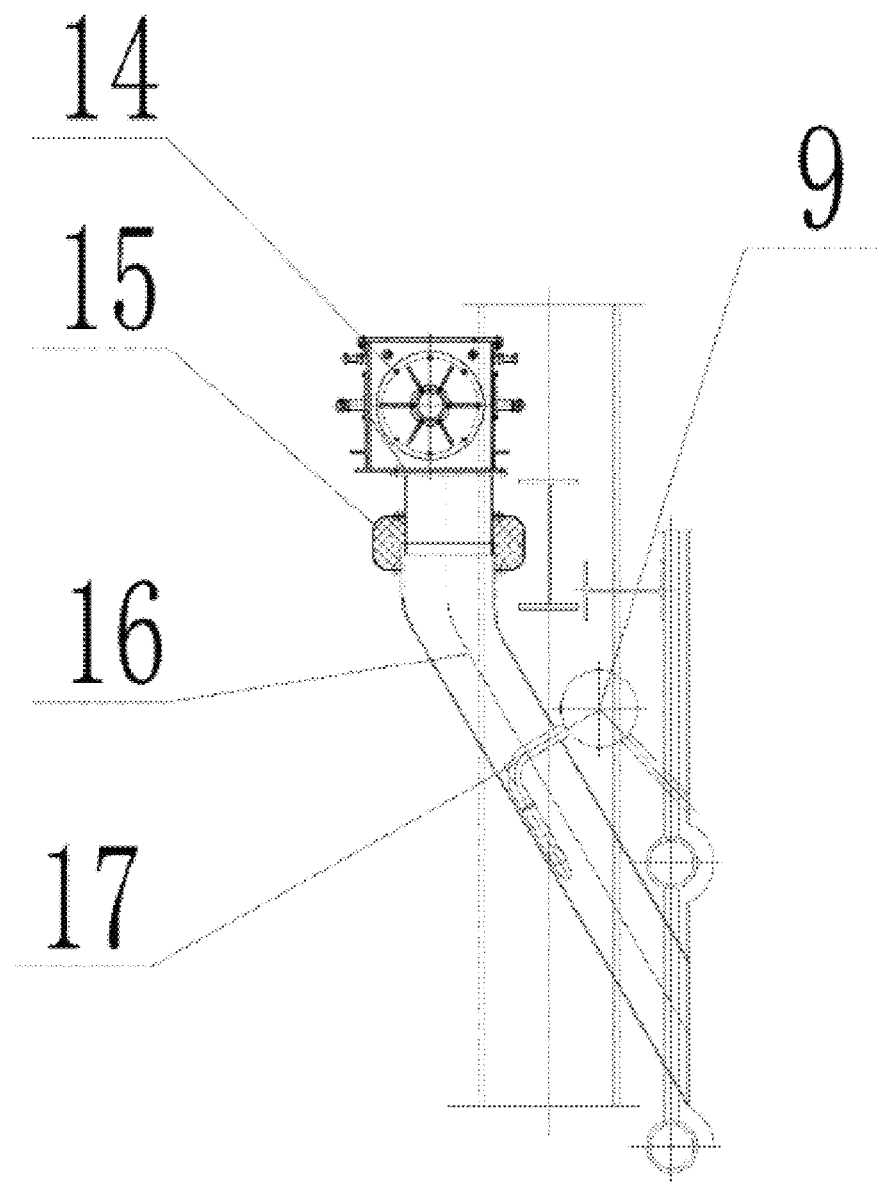
FIG. 3 is a front view of the schematic diagram of the short timber for cultivating fungus feeding device in the present disclosure.
Figure 4:
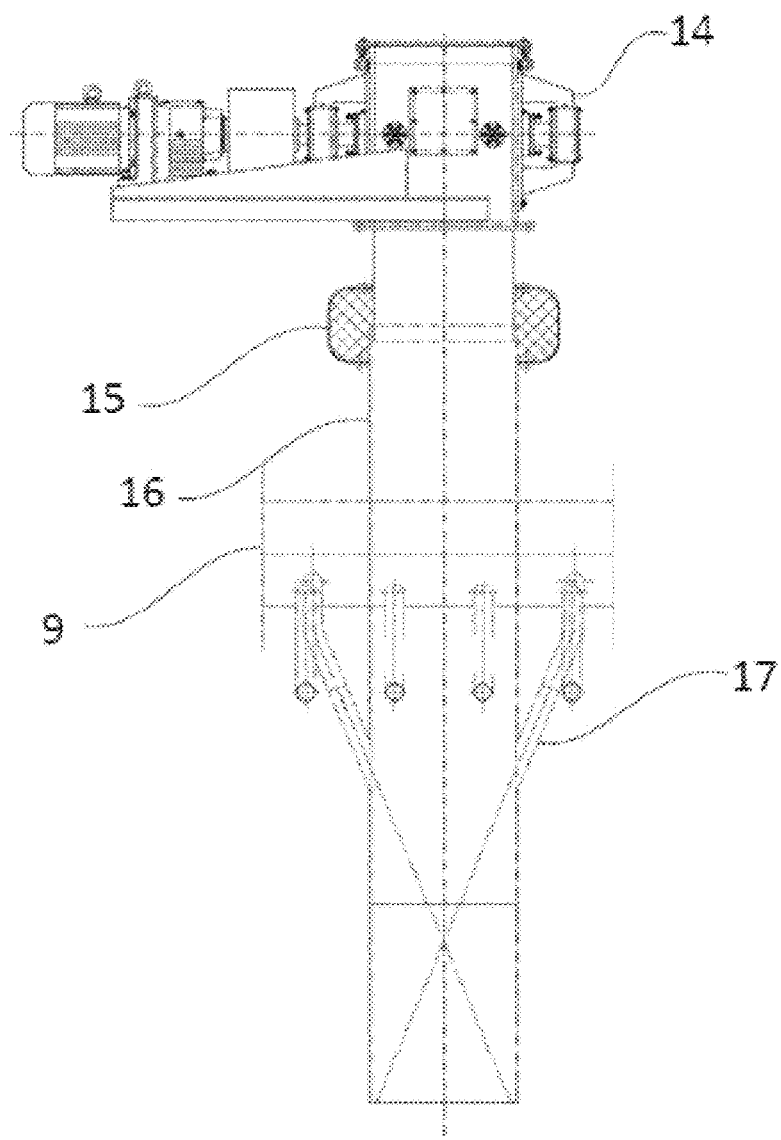
FIG. 4 is a side view of the schematic diagram of the short timber for cultivating fungus feeding device in the present disclosure.

As shown in FIG. 1 to FIG. 4, the boiler for co-firing municipal solid waste and short timber for cultivating fungus in the present embodiment includes a boiler chamber 18 and a fire grate 1. The boiler chamber 18 includes a furnace 2, a reburning chamber 3 and a third flue 4. A front arch 7 and a rear arch 8 are arranged on a lower portion of the furnace 2 and located above the fire grate 1. Multiple layers of secondary air 9 are distributed at the lower portion of a front wall of the furnace 2, the front arch 7 and the rear arch 8. An short timber for cultivating fungus feeding device 13 is arranged on a lower portion of the front wall of the furnace 2, and includes a star-shaped feeding machine 14 and a hopper 16. A skin expansion joint 15 is arranged between the star-shaped feeding machine 14 and the hopper 16, and an air pipe 17 is arranged on the hopper 16. The reburning chamber 3, the third flue 4, a horizontal flue 5 and a tail flue 6 are sequentially arranged behind the furnace 2. The boiler internal desulfurization nozzles 10 and the Polymer Non-Catalytic Reduction (PNCR) denitration nozzles 11 are arranged in a height direction of the furnace 2. A baking soda dry deacidification nozzle 12 is arranged at a top of the tail flue 6.

What is claimed:

1. A boiler for co-firing municipal solid waste and short timber for cultivating fungus comprising:
   a boiler chamber having a fire grate (1);
     a furnace (2);
     a reburning chamber (3);
     a third flue (4);
     a front arch (7) and a rear arch (8) that are arranged on a lower portion of the furnace; and
     a short timber feeding device (13) for cultivating fungus arranged on a lower portion of a front wall of the furnace;
     wherein the short timber feeding device comprises a star-shaped feeding machine (14), a hopper (16), a skin expansion joint (15) arranged between the star-shaped feeding machine and the hopper (16), and an air pipe (17) integrated with the hopper.

2. The boiler for co-firing municipal solid waste and short timber for cultivating fungus according to claim 1, wherein a layer of a plurality of boiler internal desulfurization nozzles (10) and two layers of a plurality of Polymer Non-Catalytic Reduction denitration nozzles (11) are arranged in a height direction of the furnace.

3. The boiler for co-firing municipal solid waste and short timber for cultivating fungus according to claim 2, further including a baking soda dry deacidification nozzle (12) arranged at a top of a tail flue (6).

\* \* \* \* \*